(12) United States Patent
Krimstock et al.

(10) Patent No.: US 10,827,074 B2
(45) Date of Patent: Nov. 3, 2020

(54) ENFORCEMENT OF CONTACT CENTER COMMUNICATION SESSION ROUTING BEHAVIORS

(71) Applicant: Avaya Inc., Santa Clara, CA (US)

(72) Inventors: Roger I. Krimstock, Boulder, CO (US); Dwayne W. Ockel, Northglenn, CO (US); Gregory P. Schin, Highlands Ranch, CO (US); Kevin Archer, Brighton, CO (US); Rusty Nelson, Brighton, CO (US)

(73) Assignee: Avaya Inc., Santa Clara, CA (US)

(*) Notice: Subject to any disclaimer, the term of this patent is extended or adjusted under 35 U.S.C. 154(b) by 0 days.

(21) Appl. No.: 16/169,813

(22) Filed: Oct. 24, 2018

(65) Prior Publication Data

US 2020/0137232 A1 Apr. 30, 2020

(51) Int. Cl.
*H04M 3/523* (2006.01)
*H04M 3/51* (2006.01)
*G06Q 10/06* (2012.01)

(52) U.S. Cl.
CPC .... *H04M 3/5233* (2013.01); *G06Q 10/06398* (2013.01); *H04M 3/5175* (2013.01); *H04M 3/5183* (2013.01)

(58) Field of Classification Search
CPC ............ H04M 3/5233; H04M 3/5183; H04M 3/5232; H04M 3/523
USPC ............ 379/265.06, 265.05, 266.01, 265.11
See application file for complete search history.

(56) References Cited

U.S. PATENT DOCUMENTS

| | | | | |
|---|---|---|---|---|
| 5,970,065 | A * | 10/1999 | Miloslavsky | ........... H04L 12/64 370/352 |
| 8,300,798 | B1 * | 10/2012 | Wu | ..................... H04M 3/5233 379/265.11 |
| 9,025,759 | B1 | 5/2015 | Warder | |
| 2003/0059016 | A1 * | 3/2003 | Lieberman | ............... B07C 3/00 379/201.03 |
| 2006/0062373 | A1 | 3/2006 | Chervets et al. | |
| 2010/0111286 | A1 | 5/2010 | Chishti | |
| 2013/0223610 | A1 | 8/2013 | Kohler et al. | |
| 2018/0074866 | A1 | 3/2018 | Ristock et al. | |

FOREIGN PATENT DOCUMENTS

CN 107872593 4/2018

OTHER PUBLICATIONS

European Search Report for European Patent Application No. 19199716.2, dated Jul. 15, 2020, 13 pages.

\* cited by examiner

*Primary Examiner* — Thjuan K Addy
(74) *Attorney, Agent, or Firm* — Sheridan Ross P.C.

(57) ABSTRACT

Routing one or more routing characteristics of a communication session/or agent session are identified in real-time. For example, a routing characteristic is captured for a communication session (e.g., a voice call) as it goes into a contact center queue and then to an agent communication endpoint. The routing characteristics of the communication session/agent sessions is compared to one or more predefined routing characteristics that identify a wanted and/or unwanted communication session routing behavior/agent session in the contact center network. In response to identifying the wanted and/or unwanted communication session routing behavior in the contact center network, routing of the communication session and/or agent session in the contact center network are automatically changed.

20 Claims, 5 Drawing Sheets

ENFORCEMENT OF CONTACT CENTER COMMUNICATION SESSION ROUTING BEHAVIORS

BACKGROUND

Today, in most contact centers, communication session routing (e.g., routing of voice calls in the contact center) is tracked and preserved for reporting and analysis—both in real-time and on an historical basis. Analysis of the communication session routing data may be potentially used to detect "after the fact" misbehavior of contact center agents. However, the current analysis makes it difficult to identify and prevent, in real-time, communication session routing misbehavior within a contact center.

SUMMARY

These and other needs are addressed by the various embodiments and configurations of the present disclosure. Routing one or more routing characteristics of a communication session/or agent session are identified in real-time. For example, a routing characteristic is captured for a communication session (e.g., a voice call) as it goes into a contact center queue and then to an agent communication endpoint. The routing characteristics of the communication session/agent sessions is compared to one or more predefined routing characteristics that identify a wanted and/or unwanted communication session routing behavior/agent session in the contact center network. In response to identifying the wanted and/or unwanted communication session routing behavior in the contact center network, routing of the communication session and/or agent session in the contact center network are automatically changed.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
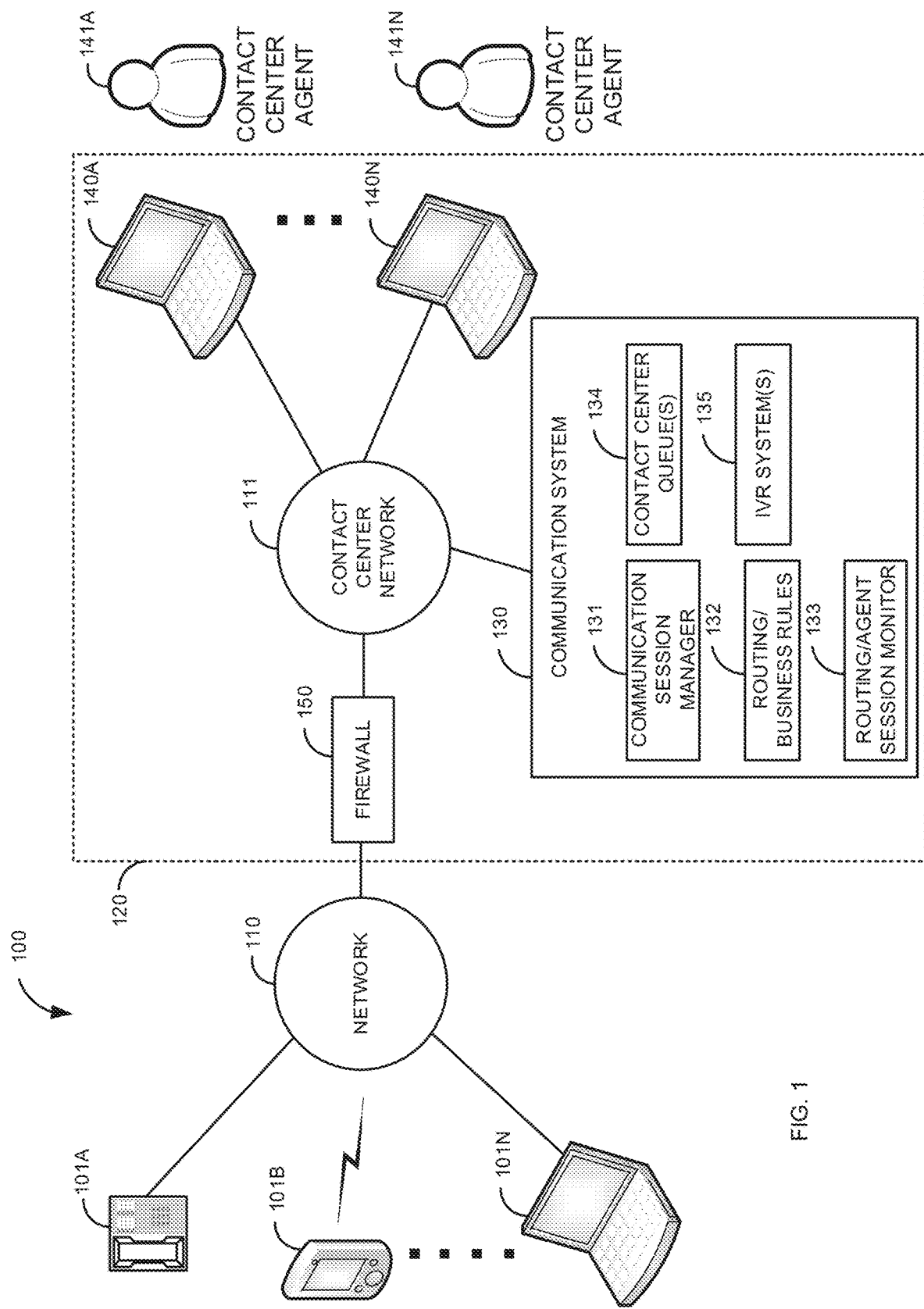
FIG. 1 is a block diagram of a first illustrative system for enforcing agent session and/or communication session routing behaviors in a contact center.

FIG. 1 is a block diagram of a first illustrative system 100 for enforcing agent session communication session routing behaviors in a contact center 120. The first illustrative system 100 comprises user communication endpoints 101A-101N, a network 110, a contact center network 111, a contact center 120, a communication system 130, agent communication endpoints 140A-140N, and a firewall 150.

The user communication endpoints 101A-101N can be or may include any communication endpoint device that can communicate on the network 110, such as a Personal Computer (PC), a telephone, a conferencing system, a cellular telephone, a Personal Digital Assistant (PDA), a tablet device, a notebook device, a smart phone, and/or the like. The user communication endpoints 101A-101N are devices where a communication sessions ends. The user communication endpoints 101A-101N are not network elements that facilitate and/or relay a communication session in the network 110, such as a communication manager or router. As shown in FIG. 1, any number of user communication endpoints 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, Instant Messaging (IM) protocols, text messaging protocols, and/or the like. Thus, the network 110 is an electronic communication network configured to carry messages via packets and/or circuit switched communications.

The contact center network 111 is typically a network that is associated with the contact center 120. The contact center network 111 is typically a corporate network (e.g., a LAN/WAN) that supports the contact center 120.

The contact center 120 comprises the contact center network 111, the communication system 130, the agent communication endpoints 140A-140N and the firewall 150. The contact center 120 can be or may include any hardware coupled with software that can manage routing incoming and/or outgoing communication sessions between the user communication endpoints 101A-101N and the agent communication endpoints 140A-140N. The contact center 120 may route various types of communication sessions, such as voice communication sessions, video communication sessions, Instant Messaging (IM) communication sessions, email communication sessions, social media communication sessions, virtual reality communication sessions, and/or the like. The agent communication endpoints 140A-140N in the contact center 120 may be remote agent communication endpoints 140. For example, a contact center agent 141 may use a Virtual Private Network (VPN) communication session to connect to and be part of the contact center 120.

The communication system 130 can be or may include any hardware coupled with software that manages routing of communication sessions in the contact center 120, such as, a Private Branch Exchange (PBX), a session manager, a communication manager, a proxy server, a central office switch, and/or the like. The communication system 130 further comprises a communication session manager 131, routing/business rules 132, a routing/agent session monitor 133, contact center queue(s) 134, and one or more Interactive Voice Response (IVR) system(s) 135.

The communication session manager 131 manages routing of communication sessions between the user communication endpoints 101A-101N, the contact center queue(s) 134, the IVR system(s) 135, and the agent communication endpoints 140A-140N. For example, the communication session manager 131 may initially route an incoming voice call from the communication endpoint 101A to the IVR system 135. The voice call may then be routed to the contact center queue 134 and then to the agent communication endpoint 140A. The communication session manager 131 dynamically routes communications based on the routing/business rules 132.

The routing/business rules 132 are rules that define different routing behaviors (and/or agent behaviors) and/or business rules that may occur on the contact center 120. The routing/business rules 132 may be user defined rules, pre-defined rules, and/or auto-generated routing/business rules 132. For example, the routing/business rules 132 may be automatically generated using Artificial Intelligence (AI) processes that identify new types of routing behaviors, agent behaviors, agent session behaviors, and/or the like. The routing/business rules 132 may be based on a Vector Directory Number (VDN), telephone numbers, communication endpoints 101, agent communication endpoints 140, agent sessions, contact center queue(s) 134, IVR system(s) 135, and/or the like.

The routing/agent session monitor 133 monitors how communication sessions are routed in the contact center 120 by the communication session manager 131. The routing/agent session monitor 133 generates routing characteristics that are used to identify routing/business behaviors defined in the routing/business rules 132. The routing/agent session monitor 133 can monitor any kind of communications, such as voice calls, video calls, Instant Messaging (IM) sessions, virtual reality sessions, text messaging, emails, and/or the like. The routing/agent session monitor 133 can monitor a communication session as it progresses in the contact center 120, such as, being received, being transferred, being held, being conferenced, being forwarded, being deleted (e.g., deleting an email), sending a response, ending, dropped, and/or the like. The routing/agent session monitor 133 can identify routing characteristics, such as, what agent communication endpoints 140, contact center queue(s) 134, IVR system(s) 135 and/or the like have been involved in a communication session. The routing/agent session monitor 133 can identify telephone numbers, call vectors, email addresses, universal resource identifiers, trunks, communication networks, contact center agents 141, supervisors, and/or the like that are used in a communication session. As discussed herein, a contact center agent 141 may also be a supervisor.

The routing/agent session monitor 133 can monitor a state of a contact center agent 141. For example, the contact center agent 141 may login to the contact center 120. The contact center agent 141 may set their state to available to indicate that communication sessions (e.g., from the contact center queue(s) 134) can be routed to the contact center agent's communication endpoint 140. The contact center agent 141 can then set their status to auxiliary to indicate that the contact center agent 141 is no longer available. Being in the auxiliary state prevents communication sessions (e.g., from the contact center queue(s) 134) from being routed to the agent communication endpoint 140. The routing/agent session monitor 133 uses the agent session to identify patterns of contact center agent 141 behavior.

The contact center queue(s) 134 are configured to hold communication sessions which are typically then sent from the contact center queue(s) 134 to the agent communication endpoints 140A-140N. The contact center queue(s) 134 may work in various ways, such as first-in-first-out, based on priorities, based on contact center agent 141 groups, and/or the like. The contact center queue(s) 134 may be for inbound and/or outbound communication sessions. In one embodiment, instead of using contact center queue(s) 134, the contact center 120 may use communication session pools (not shown) where contact center agents 141 may select communication sessions.

The IVR system(s) 135 can be any hardware coupled with software that can provide interactive voice communications with users of the user communication endpoints 101. The IVR system(s) 135 may comprise different menus that allow a user to identify how user can be serviced by the contact center 120. For example, the user may select to be connected to a contact center queue 134 for supporting a specific type of product.

The agent communication endpoints 140A-140A may be similar devices to the user communication endpoints 101A-101N. The agent communication endpoints 140A-140N may comprise multiple agent communication endpoints 140 (e.g., a telephone and personal computer) for each contact center agent 141A-141N.

The firewall 150 can be or may include any hardware coupled with software that can provide protection services for the contact center network 111, such as a Session Border Controller (SBC), a Network Address Translator (NAT), a packet filtering firewall, a circuit level gateway, a state inspection firewall, an application gateway, a deep packet inspection firewall, and/or the like. The firewall 150 provides protection services for the contact center network 111. In one embodiment, the firewall 150 is not included.

Figure 2:
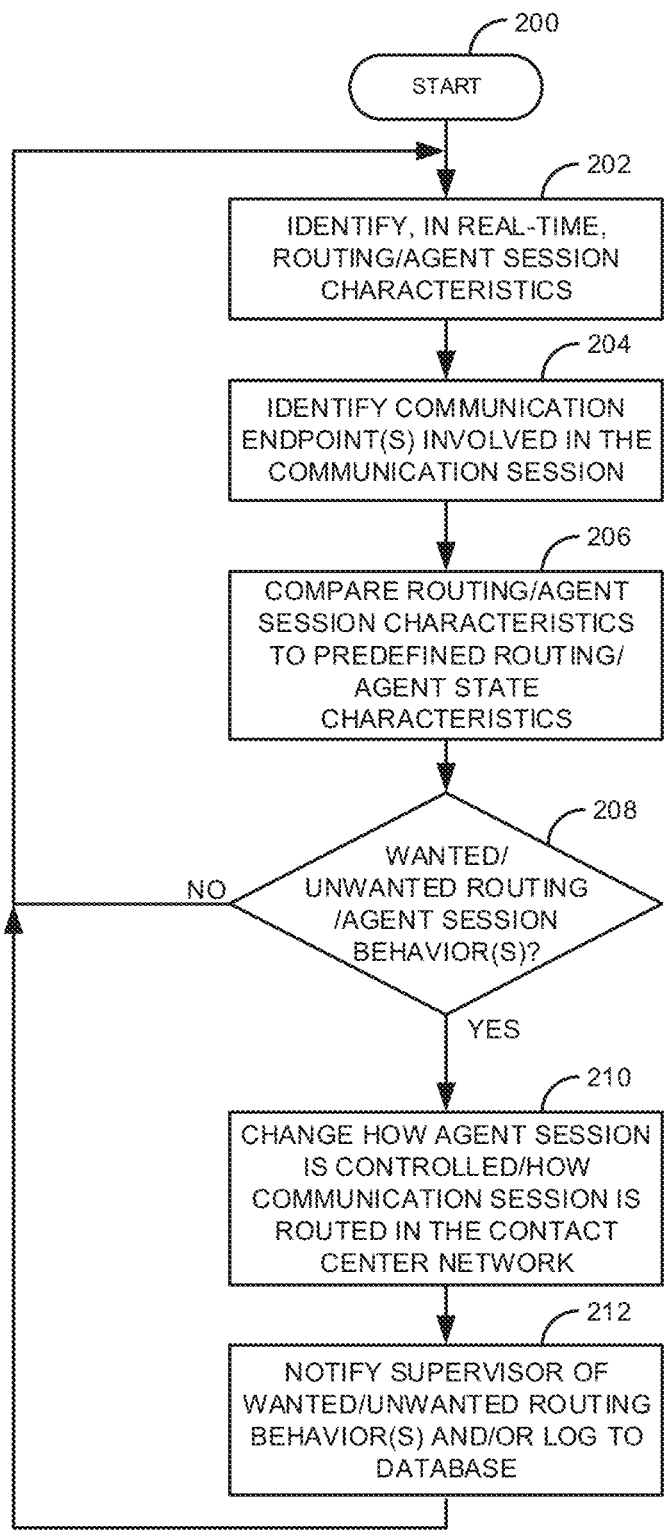
FIG. 2 is a flow diagram of a process for enforcing agent session and/or communication session routing behaviors in a contact center.
Figure 3:
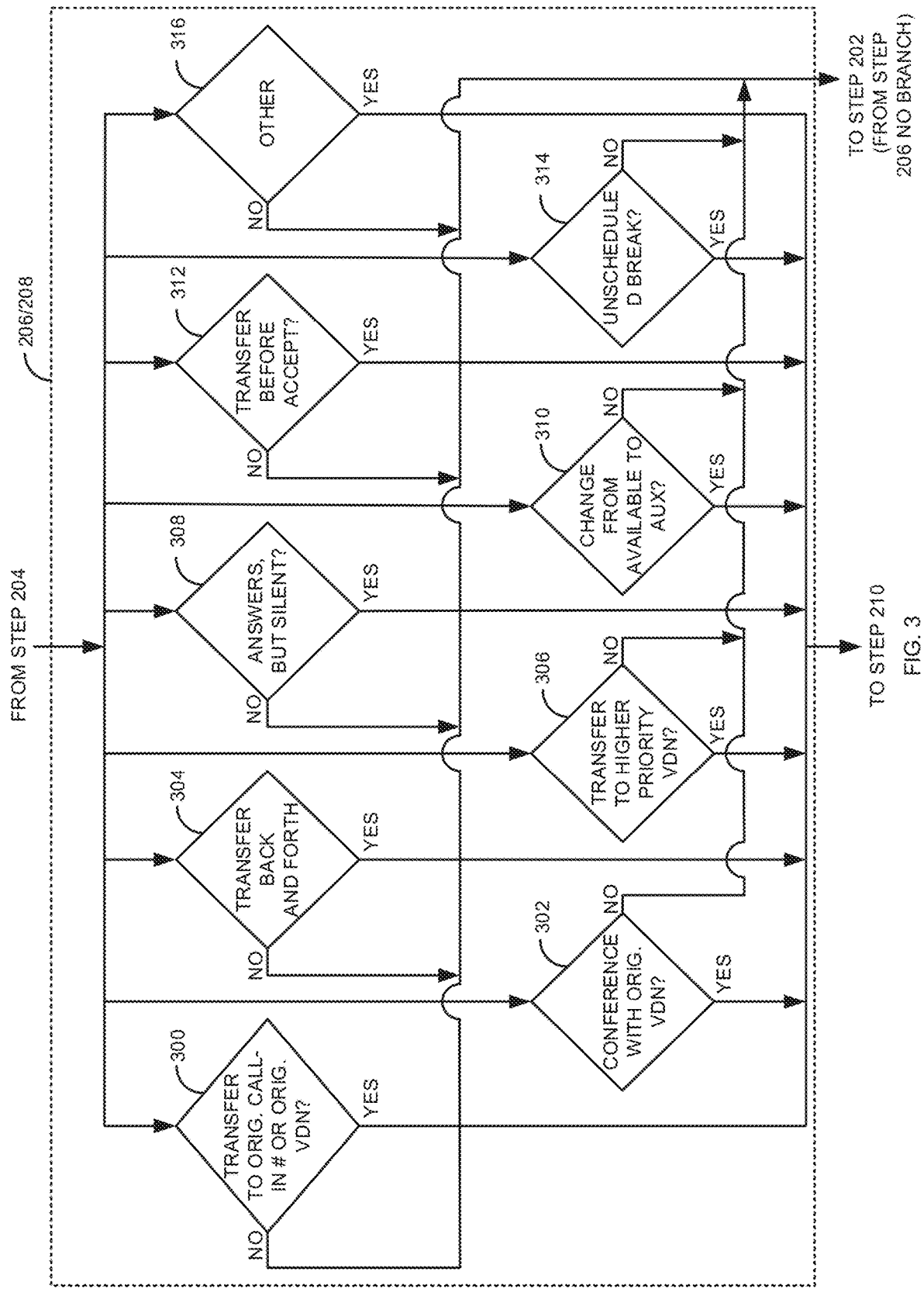
FIG. 3 is a flow diagram of a process for identifying different types of communication session routing behaviors.
Figure 4:
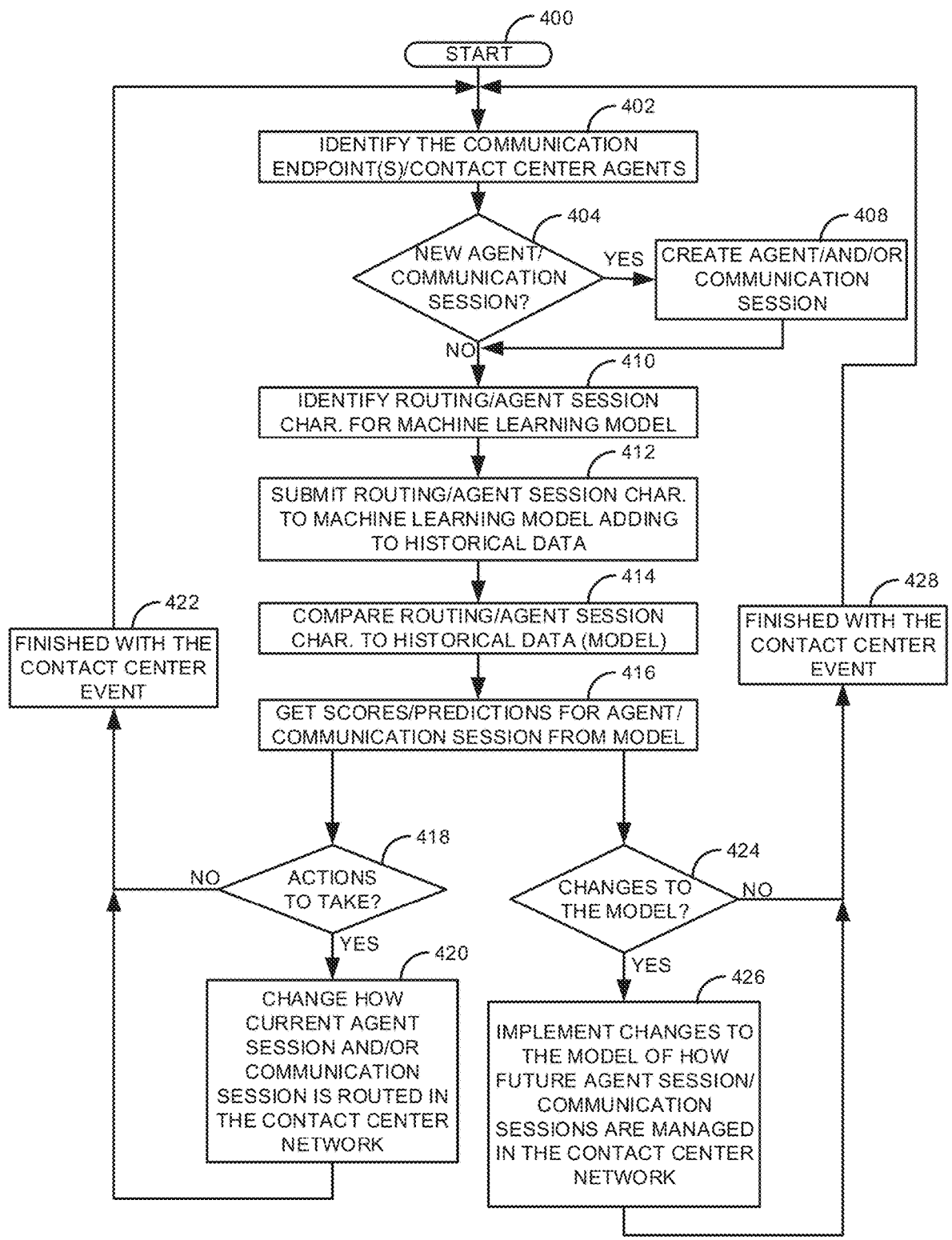
FIG. 4 is a flow diagram of a process of dynamically changing a routing model in a contact center (and acting on wanted/unwanted behaviors).

FIG. 2 is a flow diagram of a process for enforcing communication session routing behaviors in a contact center 120. Illustratively, the user communication endpoints 101A-101N, the communication system 130, the communication session manager 131, the routing/agent session monitor 133, the contact center queue(s) 134, the IVR system(s) 135, and the agent communication endpoints 140A-140N are stored-program-controlled entities, such as a computer or microprocessor, which performs the method of FIGS. 2-4 and the processes described herein by executing program instructions stored in a computer readable storage medium, such as a memory (i.e., a computer memory, a hard disk, and/or the like). Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The process of FIG. 2 is based on monitoring a single communication session/agent session. As one of skill in the art would recognize, the process of FIG. 2 can be implemented in a contact center where large number of communication sessions/agent sessions occur at the same time.

The routing/agent session monitor 133 identifies, in real-time, routing characteristics for how a communication session is routed in the contact center network 111 and for how an agent session is being set in step 202. For example, as an incoming voice communication session is first received and routed then to the IVR system 135, the routing/agent session monitor 133 identifies routing characteristics for the voice communication session. In addition, the routing/agent session monitor 133 can detect agent session characteristics, such as not logged in, available, in auxiliary, on vacation, on break, handling a communication session, and/or the like. As the communication session progresses (e.g., as a call is transferred from the IVR system 135 to the contact center queue 134 and then to the agent communication endpoint 140A of an available contact center agent 141) the routing/agent session monitor 133 identifies additional routing characteristics for the voice communication session along with any associated agent session (handling a communication session at this point). If the contact center agent's session characteristics goes from available to auxiliary during the communication session, this is also logged. The routing/agent session monitor 133 identifies routing characteristics and agent session characteristics throughout the life of the communication session (and all communication sessions).

The routing/agent session monitor 133 identifies, in step 204, the agent communication endpoint(s) 140 (and optionally the user communication endpoint 101) involved in the communication session (e.g. the agent communication endpoint 140A and the user communication endpoint 101A in this example).

The routing/agent session monitor 133 compares the identified routing characteristics/agent session characteristics to predefined routing characteristics/agent session characteristics in step 206. For example the routing/business rules 132 may define specific types of routing/business characteristic(s) that the routing/agent session monitor 133 compares to the identified routing characteristic(s) to identify a predefined unwanted routing/business behavior (or possibly a wanted routing behavior). The routing/business rules 132 may define an individual routing characteristic (e.g., a specific type of call transfer), a sequence of characteristics (e.g., how a communication session is routed in the contact center 120), and/or one or more agent session characteristics (e.g., a contact center agent 131 going from available to auxiliary during a communication session). For example, the routing/business rules 132 may define routing characteristics of an unwanted routing/business behavior that specifies when an agent communication endpoint 140 requests that a voice call is transferred back to an original call-in telephone number (e.g., a 1-800 number for the contact center 120). If the voice communication session is transferred back to the original call-in telephone number by the agent communication endpoint 140A (initiated by the contact agent 141A), the comparison by the routing/agent session monitor 133 in step 206 will match (unless there is also a threshold that has to be met). The comparison of step 206 may use various routing characteristics, agent session characteristics, and/or variables, such as, time periods, agent groups, routing to a specific contact center queue 134, routing to a specific IVR system 135, routing to a specific group of agent communication endpoints 140, a specific telephone number, a specific Vector Directory Number (VDN), a specific type of contact center queue 134, a specific voicemail system, an action that impacts a communication session (e.g., placing a call on hold), a contact center agent 141 going from available to auxiliary, a contact center agent going from auxiliary to available, and/or the like. The comparison of step 206 may identify multiple unwanted routing/business behaviors. For example, step 206 may use multiple routing/business rules 132 that are used to identify one or more unwanted routing/business behaviors.

Alternatively, step 206 may identify one or more wanted routing behaviors. For example, the template may identify that if a contact center agent 141 handles a call using one or less call transfers that this is identified as a wanted behavior. If there is not a match to wanted/unwanted routing/business behavior in step 208, the process goes back to step 202.

Otherwise, if a wanted/unwanted routing/business behavior is matched, in step 208, the routing/agent session monitor 133 then changes (e.g., prevents), in step 210, how the communication session is routed in the contact center network 111 and/or how the agent session is controlled. For example, if the unwanted routing/business behavior is where the communication session is transferred by the contact center agent 141A at the agent communication endpoint 140A back to an original call-in telephone number, the change would be to prevent the communication session from being transferred back to the original call-in telephone number. In addition, if the behavior is a wanted behavior, the routing/agent session monitor 133 may change how the communication session is routed and/or how a contact center agent 141 can control their agent session.

The changing of how agent sessions and/or communication sessions are routed may be to change functionality of an agent communication endpoint 140. For example, a hold button may be disabled, removed, or added, a transfer button may be removed, disabled, or added, a keypad may be temporarily disabled, added, or removed, and/or the like.

In addition, in step 210, the routing/agent session monitor 133 may organize how the behaviors are managed. For example, if two unwanted routing/agent session behaviors are identified in step 208, the routing/agent session monitor 133 may elect to only prevent a one of the identified unwanted routing/agent session behaviors because the steps for preventing unwanted behaviors are mutually exclusive. Alternatively, the routing/agent session monitor 133 may determine an order in which to prevent the unwanted behaviors.

The routing/agent session monitor 133 may optionally notify a supervisor of the unwanted routing/business behavior in step 212. Alternatively, the routing/agent session monitor 133 may log the unwanted routing/business behavior to a database in step 212 (or do both). The routing/agent session monitor 133 can also flag the unwanted routing/business behavior. For example, a routing/business rule 132 may require multiple instances of the unwanted routing behavior before notifying the supervisor in step 212. In one embodiment, the routing behavior/agent sessions are always logged. The process then goes to step 202.

In FIG. 2, steps 210 and 212 may be reversed or implemented in parallel. For example, the supervisor may be notified that a contact center agent 141 has transferred a call back to an original VDN (step 212). The supervisor can then deny and/or allow the call transfer back to the original VDN (step 210).

FIG. 3 is a flow diagram of a process for identifying different types of communication session routing/business behaviors. FIG. 3 is an illustrative example of steps 206/208 of FIG. 2. Although FIG. 3 shows various ways for identifying different types of communication session routing/business behaviors/agent states, one of skill in the art would recognize that other types of communication session routing/business behaviors can be detected in a similar manner. One of skill in the art could also envision that a subset or various combinations of the unwanted routing/business behaviors of FIG. 3 may be identified.

After identifying, in real-time, how the communication sessions are routed in the contact center network 111/agent session characteristics, in step 204, the routing/agent session monitor 133 determines various types of wanted/unwanted routing/agent session behaviors. In FIG. 3, the various types of wanted/unwanted routing/agent session behaviors are shown as being identified in parallel. For example, each type of wanted/unwanted routing/agent session behaviors may be implemented in individual computer threads. In one embodiment, the wanted/unwanted routing/agent session behaviors may be implemented in series.

In step 300, the routing/agent session monitor 133 determines if a communication session is being transferred to an original call-in telephone number (e.g., a 1-800 number) or an original VDN (e.g., an extension number of a contact center queue 134). The reason why contact center agents 141 transfer a communication session back to the original call-in number or the original VDN is to get credit for handling the communication session without having to do any work. The original-call-in telephone number, as defined herein and in the claims, may be a telephone number, a Universal Resource Identifier (URI), or any identifier that uniquely identifies the contact center 120 (e.g., an IP address).

The original VDN is a number (e.g., an extension) or address used to route the communication session to a contact center queue 134 (or a communication session pool). For example, after the user identifies the purpose of the communication session using the IVR system 135, the IVR system 135 may route the communication session to the contact center queue 134. If the communication session is being transferred to the original call-in number or the original VDN, the process goes step 210 where the agent communication endpoint 140 is prevented from transferring a communication session using an original call-in number/original VDN.

The routing/agent session monitor 133 determines if the agent communication endpoint 140 has conferenced the communication session with the original VDN in step 302. For example, the contact center agent 141 may conference the user back to the contact center queue 134 using the original VDN while the contact center agent 141 does not speak in the conference call. Because the contact center 120 still shows that the contact center agent 141 is still supporting the communication session, the contact center agent 141 gets credit for supporting the call while not actually doing any work. If the communication session is being conferenced in using the original VDN, the process goes to step 210 where the contact center agent 141 is prevented from conferencing with the original VDN.

The routing/agent session monitor 133 determines, in step 304, if the communication session is being transferred back-and-forth between agent communication endpoints 140. For example, the contact center agent 141A may say that the call was sent to the wrong contact center agent 141 and then transfer the communication session to the agent communication endpoint 140N. The contact center agent 141N may then transfer the call to another contact center agent 141 (or back to the same contact center agent 141A). This allows all the contact center agents 141 who handle the call to get credit for handling a communication session even though they are not actually handling the communication session (or only one of them actually handles the communication session). As described herein and in the claims, transferring back-and-forth may include a single transfer between contact center agents 141. If the communication session is being transferred back-and-forth, the process goes to step 210 where the contact center agents 141 are prevented from transferring communication sessions back-and-forth.

The routing/agent session monitor 133 determines, in step 306, if the communication session is being transferred to a higher priority VDN (i.e., a higher priority contact center queue 134). A contact center agent 141 may just transfer the communication session to the higher priority VDN without talking to the user and still get credit for handling the communication session. In some cases, transferring the communication session to the higher priority VDN may be an appropriate action. In this embodiment, a threshold of transfers to the higher priority VDN may be used or a time period after the communication session is established. For example, the threshold may be that the contact center agent 141 cannot transfer more than five communication sessions in an hour to the higher priority VDN. In this embodiment, a supervisor may be notified and have to approve the transfer to the higher priority VDN. If the communication session is being transferred to the higher priority VDN in step 306, the process goes to step 210 where the contact center agent 141 is prevented (or has to have approval) from transferring a communication session using a higher priority VDN.

The routing/agent session monitor 133 determines if the contact center agent 141 answers the communication session but is silent (does not talk) in step 308. For example, the routing/agent session monitor 133 can listen to the communication session and see if the contact center agent 141 talks or is silent when the communication session is first established. In this case, the user typically hangs up because he/she thinks that the communication session has been dropped. The contact center agent 141 gets credit for handling the communication session even though the contact center agent 141 did not handle the communication session. If the contact center agent 141 answers the communication session, but is silent in step 308, the process goes to step 210 where the contact center agent 141 is prevented from answering a communication session without speaking. For example, the routing/agent session monitor 133 may provide a whisper mode (that only the contact center agent 141 hears) that tells the contact center agent 141 to speak or a violation will be logged.

The routing/agent session monitor 133 determines if the contact center agent 141 is changing from available to auxiliary (a mode that prevents communication sessions being routed to the contact center agent 141) and then back again in step 310. Step 310 may be implemented based on an existing communication session or where the contact center agent 141 is currently not engaged in a communication session. For example, the contact center agent 141 may change the status every couple of minutes to avoid receiving any communication sessions. Changing the status places the contact center agent 141 at the bottom of the contact center queue 134 (over other contact center agents 141) for handling incoming or outgoing communication sessions. By repeating this behavior, the contact center agent 141 may not handle any or a limited number of communication sessions while still getting paid. If the contact center agent 141 is changing his/her status from available to auxiliary, in step 310, the process goes to step 210 where the contact center agent 141 is prevented (or must do so based on supervisor approval) from going back and forth between available and auxiliary. In one embodiment, in step 210, the agent may be placed at the top of the list of agents so the agent receives the next available communication session.

The routing/agent session monitor 133 determines, in step 312, if the contact center agent 141 transfers the communication session, but hangs up before the call transfer is accepted (i.e., answered). This way, the contact center agent 141 gets credit for handling the call even though the contact center agent 141 actually never does any work on the call. If the communication session is being transferred and dropped before being accepted, in step 312, the process goes to step 210 where the contact center agent 141 is prevented from hanging up before a communication session is accepted.

The routing/agent session monitor 133 determines, in step 314, if the contact center agent 141 is taking an unscheduled break (where routed calls do not go the contact center agent's communication endpoint 141). After going to break, the contact center agent 141 can then set their status to available, which places the agent to the bottom of the queue for receiving communication sessions. If the contact center agent 141 is taking an unscheduled break in step 314, the process goes to step 210 where the contact center agent 141 is prevented from taking an unscheduled break.

The process of FIG. 3 may be used to detect additional wanted/unwanted routing/business behaviors in step 316. The wanted/unwanted routing/business behavior of step 316 may be a new administered static behavior. For example, an administrator may define a rule that when a contact center agent 141 transfers a communication session to a communication endpoint 101 that is outside the contact center 120 that the contact center agent 141 is prevented from making the transfer (or must get supervisor approval). Alternatively, the contact center agent 141 may be able to continue, but the data is just flagged where it can be used in subsequent reports.

In one embodiment, the wanted/unwanted routing/business behavior in step 316 may be a newly added machine learned static model behavior, generally more complex (derivative of (subtle) statistical representations and therefore less accessible to identification and description) than the behaviors identified in 300-314 in FIG. 3, that has been accepted/administrated. For example, as discussed in FIG. 5, an automated machine learning process may identify a new wanted/unwanted behavior. An administrator may now decide to implement the new machine learned process and make it a static process (e.g., is like the unwanted behaviors of steps 300-314) that does not use the machine learning process anymore, but does use the model that is developed by the machine learning process.

In one embodiment, the wanted/unwanted routing/business behavior in step 316 may be a dynamic model that may continually change over time (also described in FIG. 4). For example, for a previously identified unwanted behavior, a contact center agent 141 may have typically taken five minutes on average before transferring a call to technical specialist. However, based on a change in a product (e.g., a new problem in the product), the average time to transfer a call to a technical specialist changes to one minute on average. In this case, the dynamic model may automatically change a parameter (e.g., a threshold from two minutes to 30 seconds) that is used to identify the unwanted behavior of a premature call transfer by a contact center agent 141. In general, the model potentially changes with each new event, as the new events are incorporated into the "history" of contact center activity, modifying the "(statistical) pattern"

and, in turn, the score/prediction for the event The dynamic models, in a sense, are where the contact center system "learns" about itself.

The different types of administered/machine learned behaviors described above for step 316 may all be detected and activated in parallel and/or over time.

The process of FIG. 3 is shown as only detecting wanted/ unwanted behaviors in parallel. However, in one embodiment, any combination of wanted/unwanted behaviors may be detected in parallel and/or in series. For example, the contact center agent 141 may answer, but be silent and then take an unscheduled break during the same communication session. Alternatively, multiple communication sessions/ agent sessions may be monitored and detected in parallel.

In one embodiment, if multiple wanted/unwanted behaviors are detected in steps 302-316, how future agent sessions are controlled and/or how communication sessions are routed in step 210 may be different than if only a single wanted/unwanted behavior is detected. For example, if the contact center agent 141 is silent and takes a break during the same communication session, the contact center agent 141 may not only be warned of the unwanted behavior, but because of the combination of unwanted behaviors, the contact center agent's supervisor may also be warned at the same time.

FIG. 4 is a flow diagram of a process for identifying dynamic routing models in a contact center network 120. The process starts in step 400. The routing/agent session monitor 133 identifies the communication endpoint(s) 101/ contact center agents 141 in step 402. The routing/agent session monitor 133 determines if there is a new agent/ communication session in step 404. If there is not a new agent/communication session in step 404, the process goes to step 410. Otherwise, if there is a new agent/communication session in step 404, the routing/agent session monitor 133 creates, in step 408, the new agent/communication session in step 408.

The routing/agent session monitor 133 identifies routing/ agent session characteristics for a machine learning model in step 410. The routing/agent session characteristics are submitted to the machine learning model in step 412. The routing/agent session characteristics are also added to the historical data in step 412. The routing/agent session monitor 133 compares the routing/agent session characteristics to the historical data model in step 414. The routing/agent session monitor 133 gets scores/predictions for agent/communication session model in step 416. If there are not changes to the model in step 424, the process goes to step 428. Otherwise, if there are changes to the model in step 424 the changes to the model are implemented as to how future agent session/communication sessions are managed in the contact center network 120 in step 426. For example, a threshold level and/or time period may be changed in step 426. The routing/agent session monitor 133 is then finished with the contact center event in step 428 and the process goes back to step 402.

If there is not an action to take in step 418, the process goes to step 422. Otherwise, if there is an action to take in step 418, the routing/agent session monitor 133 changes how current agent session and/or how communication is routed in the contact center network in step 420. For example, the contact center agent 141 may be prevented from transferring a call in a particular manner. The routing/ agent session monitor 133 is then finished with the contact center event in step 422 and the process goes to step 402.

Figure 5:
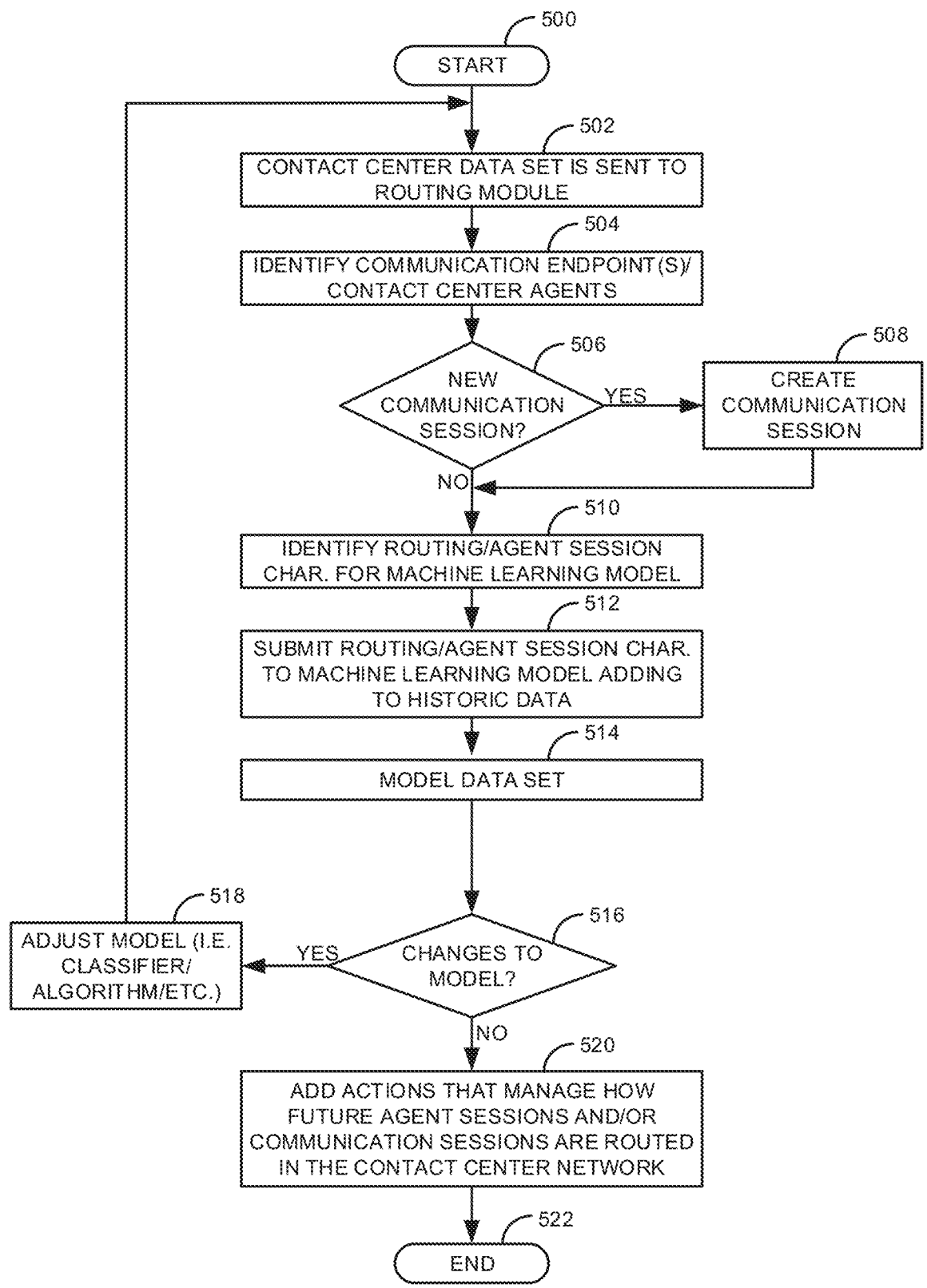
FIG. 5 is a flow diagram of a process for identifying static routing models in a contact center.

FIG. 5 is a flow diagram of a process for building a static machine learned routing model in a contact center network 120. The process starts in step 500. A contact center data set is sent to the routing module in step 502. The routing/agent session monitor 133 identifies the communication endpoint(s) 101/contact center agents 141 in step 504. The routing/agent session monitor 133 determines if there is a new agent/communication session in step 506. If there is not a new agent/communication session in step 506, the process goes to step 510. Otherwise, if there is a new agent/ communication session in step 506, the routing/agent session monitor 133 creates, in step 508 the new agent/communication session in step 508.

The routing/agent session monitor 133 identifies routing/ agent session characteristics for the machine learning model in step 510. The routing/agent session characteristics are submitted to the machine learning model in step 512. The routing/agent session characteristics are also added to the historical data in step 512. The data set is modeled in step 514. The routing/agent session monitor 133 determines, in step 516, if there are changes to the model. For example, as described in FIG. 3, the average time to transfer a call to a technical specialist may have changed from five minutes to one minute on average. In this case, the dynamic model may automatically change a parameter (e.g., a threshold from two minutes to 30 seconds) that is used to identify an unwanted behavior of a premature call transfer by a contact center agent 141. If there are changes to the model, the model is adjusted (e.g., a classifier and/or algorithm is adjusted) in step 518 and the process goes to step 502.

Otherwise, if there are not changes to the model in step 516, the routing/agent session monitor 133 adds actions that manage how future agent sessions and/or communication sessions are routed in the contact center network 120 in step 520. The process then ends in step 522. Note that the dynamic machine learned model in FIG. 4 begins with a static model that is built according to FIG. 5.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a computer readable medium coupled with the microprocessor and comprising microprocessor readable and executable instructions that program the microprocessor to:
    identify, in real-time, one or more routing characteristics for a communication session and/or agent session in a contact center network;
    compare the one or more routing characteristics for the communication session and/or agent session to one more predefined routing characteristics that identify a wanted and/or unwanted communication session behavior in the contact center network; and
    in response to identifying the wanted and/or unwanted communication session behavior in the contact center network, change routing of the communication session and/or agent session in the contact center network.

2. The system of claim 1, wherein the wanted and/or unwanted communication session behavior is where the communication session is transferred back to an original call-in telephone number and/or an original Vector Directory Number (VDN) and wherein changing the routing of the communication session and/or agent session in the contact center network comprises preventing the communication session from being transferred back to the original call-in number and/or the original VDN.

3. The system of claim 1, wherein the wanted and/or unwanted communication session behavior is where the communication session is conferenced with an original Vector Directory Number (VDN) and wherein changing the routing of the communication session and/or agent session in the contact center network comprises preventing the communication session from being conferenced with the original VDN.

4. The system of claim 1, wherein the wanted and/or unwanted communication session behavior is where the communication session is transferred to a higher priority Vector Directory Number (VDN).

5. The system of claim 1, wherein the wanted and/or unwanted communication session behavior is where the communication session is transferred multiple times between agent communication endpoints.

6. The system of claim 1, wherein the wanted and/or unwanted communication session behavior is where a contact center agent answers a communication session but is silent.

7. The system of claim 1, wherein the wanted and/or unwanted communication session behavior is where a contact center agent's session is changed in a defined time period from available to auxiliary and then back to available.

8. The system of claim 1, wherein the wanted and/or unwanted communication session behavior is a transfer before the transfer is accepted.

9. The system of claim 1, wherein the wanted and/or unwanted communication session behavior is taking a break at an unscheduled time.

10. The system of claim 1, wherein the wanted and/or unwanted communication session behavior is a transfer outside the contact center network.

11. The system of claim 1, wherein the identified wanted and/or unwanted behavior is associated with an individual communication endpoint and wherein changing the routing of the communication session and/or agent session in the contact center network comprises automatically changing how future communication sessions are routed to and/or from the individual communication endpoint.

12. The system of claim 1, wherein the microprocessor readable and executable instructions further program the microprocessor to:
    compare the routing characteristics of a communication session to historical routing characteristics of previous communication sessions in the contact center; and
    identify a potential wanted and/or unwanted communication session behavior in the contact center network, wherein the potential wanted and/or unwanted communication session is one of a statically learned behavior or a dynamically learned behavior.

13. The system of claim 12, wherein the microprocessor readable and executable instructions further program the microprocessor to:
    implement the suggested change in how the future communication sessions are routed in the contact center network.

14. A method comprising:
    identify, by a microprocessor, in real-time, one or more routing characteristics for a communication session and/or agent session in a contact center network;
    comparing, by the microprocessor, the one or more routing characteristics for the communication session and/or agent session to one more predefined routing characteristics that identify a wanted and/or unwanted communication session behavior in the contact center network; and
    in response to identifying the wanted and/or unwanted communication session behavior in the contact center network, changing, by the microprocessor, routing of the communication session and/or agent session in the contact center network.

15. The method of claim 14, wherein the changing the routing is during the communication session and/or agent session.

16. The method of claim 14, wherein the changing the routing is automatic in response to the identifying.

17. The method of claim 14, wherein the wanted and/or unwanted communication session behavior is at least one of: where the communication session is conferenced with an original Vector Directory Number (VDN), where the communication session is transferred to a higher priority Vector Directory Number (VDN), where the communication session is transferred multiple times between agent communication endpoints, where a contact center agent answers the communication session but is silent, where a contact center agent's session is changed in a defined time period from available to auxiliary and then back to available, a transfer before the transfer is accepted, taking a break at an unscheduled time, and a transfer outside the contact center network.

18. The method of claim 14, wherein the identified wanted and/or unwanted behavior is associated with an individual communication endpoint of a contact center agent and wherein changing the routing of the communication session and/or agent session in the contact center network comprises changing how future communication sessions are routed to and/or from the individual communication endpoint of the contact center agent.

19. The method of claim 14, further comprising:
comparing, by the microprocessor and during the communication session and/or agent session, the routing characteristics of a plurality of communication sessions to historical routing characteristics of previous communication sessions in the contact center for the identifying to determine the response.

20. A non-transitory computer readable medium comprising computer readable instructions that cause a microprocessor to:
identify, in real-time, one or more routing characteristics for a communication session and/or agent session in a contact center network;
compare the one or more routing characteristics for the communication session and/or agent session to one or more predefined routing characteristics that identify a wanted and/or unwanted communication session behavior in the contact center network; and
in response to identifying the wanted and/or unwanted communication session behavior in the contact center network, change routing of the communication session and/or agent session in the contact center network.

* * * * *